United States Patent Office 3,094,779
Patented June 25, 1963

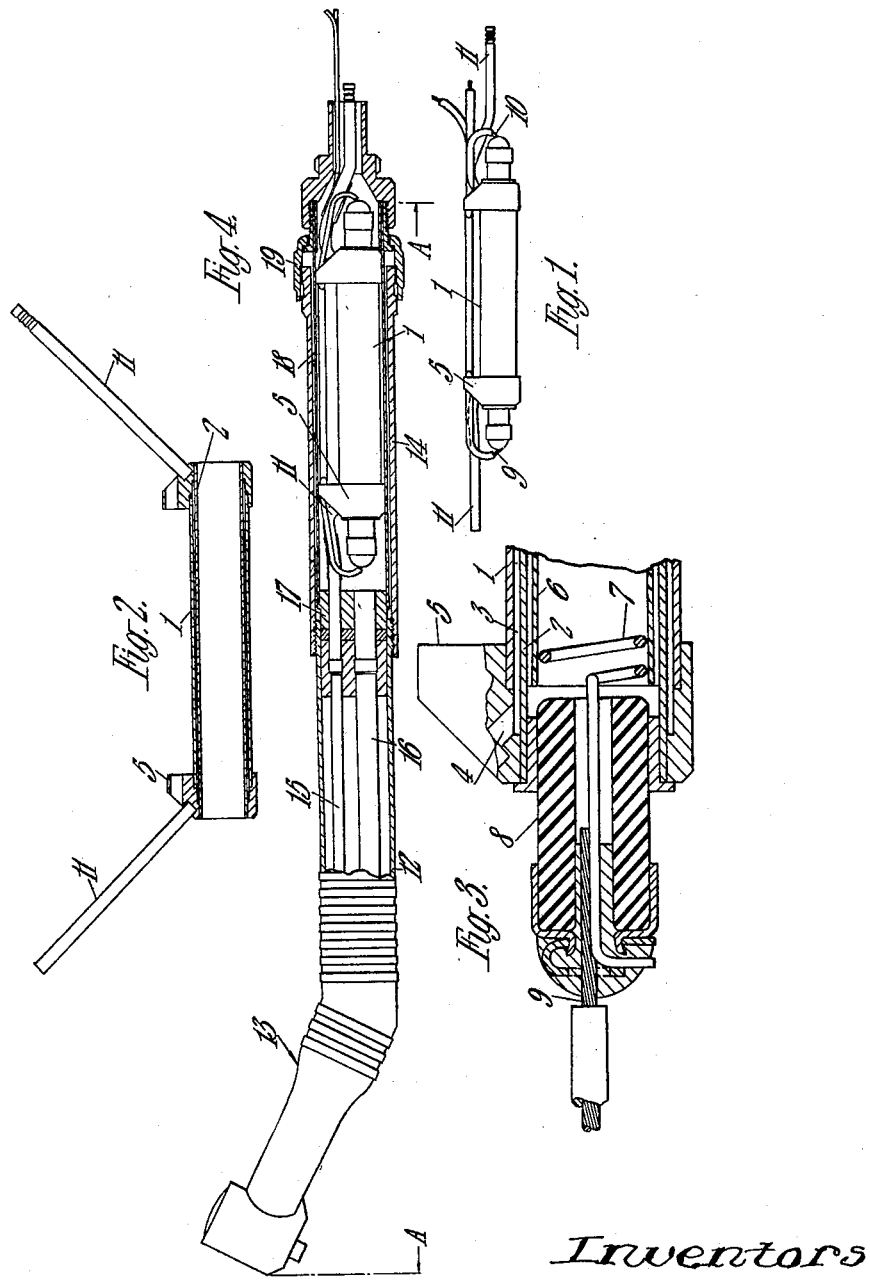

3,094,779
DENTAL HANDPIECE
Geoffrey Boulsover and Emil Oscar Muller, London, England, assignors to The Amalgamated Dental Company Limited, London, England
Filed Mar. 21, 1960, Ser. No. 16,571
Claims priority, application Great Britain Jan. 21, 1960
2 Claims. (Cl. 32—27)

This invention relates to water heaters for dental handpieces where provision is made for a water spray.

Attempts made in the past to heat the water supply have been unsatisfactory, generally because the heat remaining in the water at the spray nozzle was inadequate. It is an object of this invention to provide for the heating of the feed water in the immediate vicinity of the dental handpiece. A further object is to provide a satisfactory arrangement for heating the feed water where the handpiece is of the turbine driven type, so that the air supply for the spray is laden with oil mist. Yet another object is to provide a heater of the kind referred to, which will afford substantially immediate response, providing hot water at the dental handpiece immediately after the heater is switched on.

The invention consists in a water heater for a dental handpiece incorporating separate passageways for the flow of air and water therethrough, the passageway for the water being closely associated with an electric heater element, the heater being carried within the dental handpiece.

The passageway for the water will normally be of extended form, that is to say, it will have a length greatly exceeding its width. Thus, in one arrangement, the water passageway is defined by the bore of a metal tube, which may be helically coiled. In another preferred arrangement, the passageway is constituted by the annular shell defined between two co-axial metal tubes.

To prevent the electrical heater element from becoming fouled by oil deposited from the air supply to the handpiece, in the case of a turbine driven handpiece, it is preferred that the element should be mounted within a casing providing an air passageway which by-passes the heater element. The latter may be constituted by a wall of the water passageway, although it is preferred to have a separate heater element, electrically insulated from the water passageway, for reasons of safety. The arrangement which has generally been found to be the most suitable is one in which the air passageway is defined between a tubular casing and an inner metal tube; the water passageway is disposed radially inwardly of this metal tube and the heating element, electrically insulated from the water passageway, for example by a mica sleeve, is radially inwardly of this. The water passageway may be defined by means of a second metal tube coaxially within the first, and be in the form of an annular shell, or it may be defined by a helically coiled metal tube fitting within the first mentioned tube.

As already mentioned, it is a characterising feature of the invention that the heater is carried within the dental handpiece. It is to be understood by this that the forward portion of the handpiece, not occupied by the heater, would by itself be too short to be acceptable as a complete handpiece. It will be realised that dental handpieces are made longer than is necessary to house the working parts, the additional length being necessary to enable the handpiece stem to rest in the hands and be supported between the thumb and first finger. To facilitate assembly or disassembly for service purposes, the stem of a handpiece according to this invention may be constructed of two tubular portions secured together by any convient means for example, by bayonet fitting, screwing or soldering.

For supplying water to the heater, a control unit (not shown) for the handpiece may be provided with a water softener having a main water connection and means for regenerating or replacing water softening material.

For varying the water temperature the control unit may also incorporate a rheostat and a switch responsive to the switching-on of the water-and-air supply valve. Extra low voltage will normally be used for the heater for which purpose there may be a transformer in the control unit.

The invention will be described further with reference to the accompanying drawings, of which:

FIGURE 1 is a side view of a heater unit,
FIGURE 2 is a longitudinal sectional view of the water passageway of the unit of FIGURE 1,
FIGURE 3 is a fragmentary sectional end view of a heater incorporating the unit of FIGURE 1, and
FIGURE 4 is a longitudinal, partly sectional view of a dental handpiece having the heater unit of FIGURE 1 fitted into it.

The water heater unit of FIGURES 1–3 comprises a metal sleeve 1 spaced from an inner, coaxial metal sleeve 2. The annular space 3 defined between these sleeves represents the water passageway, inlet to and outlet from which is had by a bore 4 in a supporting perforated collar 5 provided at each end of the metal sleeves. An insulating sleeve 6 coaxially within sleeve 2 shields the latter from a helically coiled electrical heating element 7 for heating water in space 3. Insulating end supports 8 serve to convey electrical leads 9 and 10 to the helical element 7 these leads being anchored in collar 5. Water pipes 11 are soldered into the bores 4.

As seen in FIGURE 4 the water heater unit is housed within the tubular stem of a dental handpiece 13. For convenience in construction and assembly the stem is of built up construction, a rear portion 14 being soldered to a forward portion 12. The latter houses a hot water pipe 15 to which pipe 11 is connected, and an air pipe 16 receiving the air which is fed past the perforated collar 5. A plug 17 with the necessary perforations supports the end portions of pipes 15 and 16. A sleeve 18 within which the water heater unit is directly mounted, defines an air path about the sleeve 1. At the end of the handpiece a union 19 is provided for a standard air, water and electrical connection.

It is found to represent a substantial technical advance to have the heater mounted within the dental handpiece. Not only is the handpiece easier to use because of the absence of an awkward extension, which is liable to get in the way, but the weight of the handpiece is better balanced. Further, the overall weight need not be as great as when the heater is fitted outside the handpiece. The handpiece itself, measured from the forward end of the head to the rear end of the handle (stem) where the union member for the flexible supply pipe screws on, as indicated by A—A in FIGURE 4, will generally be from 4¾"–7" long, preferably from 5"–6" long.

It will be understood that, if desired, the outer sleeve or sheath of the handpiece itself may represent part of the heater, for example, to replace the sleeve 18 shown in FIGURE 4.

We claim:

1. In a dental handpiece, a tubular stem, a water heater located within said tubular stem, said water heater including a casing spaced inwardly of said stem and providing a passageway for the flow of water, an electric heater element within said casing closely adjacent said water passageway, and the space between the stem and casing constituting a passageway for the flow of air which by-passes the electric heater element.

2. In a dental handpiece, a tubular stem, a water heater within said stem, said water heater including a casing spaced from said stem, means within said casing defining a passageway for the flow of water, an insulating means disposed radially inward of the water passage means, an electric heater element located within said insulating means, and the space between said casing and tubular stem constituting a passageway for the flow of air which by-passes the heater element.

References Cited in the file of this patent

UNITED STATES PATENTS

| | | |
|---|---|---|
| 2,098,732 | Prather | Nov. 9, 1937 |
| 2,666,259 | Thau-Jensen | Jan. 19, 1954 |